United States Patent [19]
Skidmore

[11] 3,985,348
[45] Oct. 12, 1976

[54] APPARATUS AND METHOD FOR FEEDING A POWDERY MATERIAL TO A PLASTICIZED, PRESSURIZED POLYMER
[75] Inventor: Richard H. Skidmore, Strafford, Pa.
[73] Assignee: W Bar E, Incorporated, Marianna, Fla.
[22] Filed: Jan. 14, 1975
[21] Appl. No.: 540,953

[52] U.S. Cl. .............................. 259/191; 259/25; 425/203
[51] Int. Cl.² ...................... A21C 1/06; B29B 1/10; B29H 1/10
[58] Field of Search ..................... 259/191, 10, 192; 425/203; 159/2 E

[56] References Cited
UNITED STATES PATENTS
| | | | |
|---|---|---|---|
| 2,633,074 | 3/1953 | Davis | 100/90 |
| 3,114,930 | 12/1963 | Oldham et al. | 100/90 X |
| 3,183,553 | 5/1965 | Slater | 259/9 X |

FOREIGN PATENTS OR APPLICATIONS
| | | | |
|---|---|---|---|
| 676,319 | 12/1963 | Canada | 425/203 |
| 84,183 | 10/1964 | France | 425/203 |

Primary Examiner—Peter Feldman
Assistant Examiner—Donald B. Massenberg

[57] ABSTRACT

Means and method are provided for feeding through a feed port, to a plasticized polymer mass, a powdery material which contains entrapped air. An extruder is used having an entrance for feeding the polymer, and having a rotating worm, transporting the polymer from its entrance to a polymer exit; means are provided forming an entrance port for the powdery material downstream of the polymer entrance, and positive vent means are provided in the housing upstream of the powdery material entrance but downstream of the polymer entrance for drawing out the air, to prevent entrapped air or volatiles from fouling the powder feed port.

10 Claims, 1 Drawing Figure

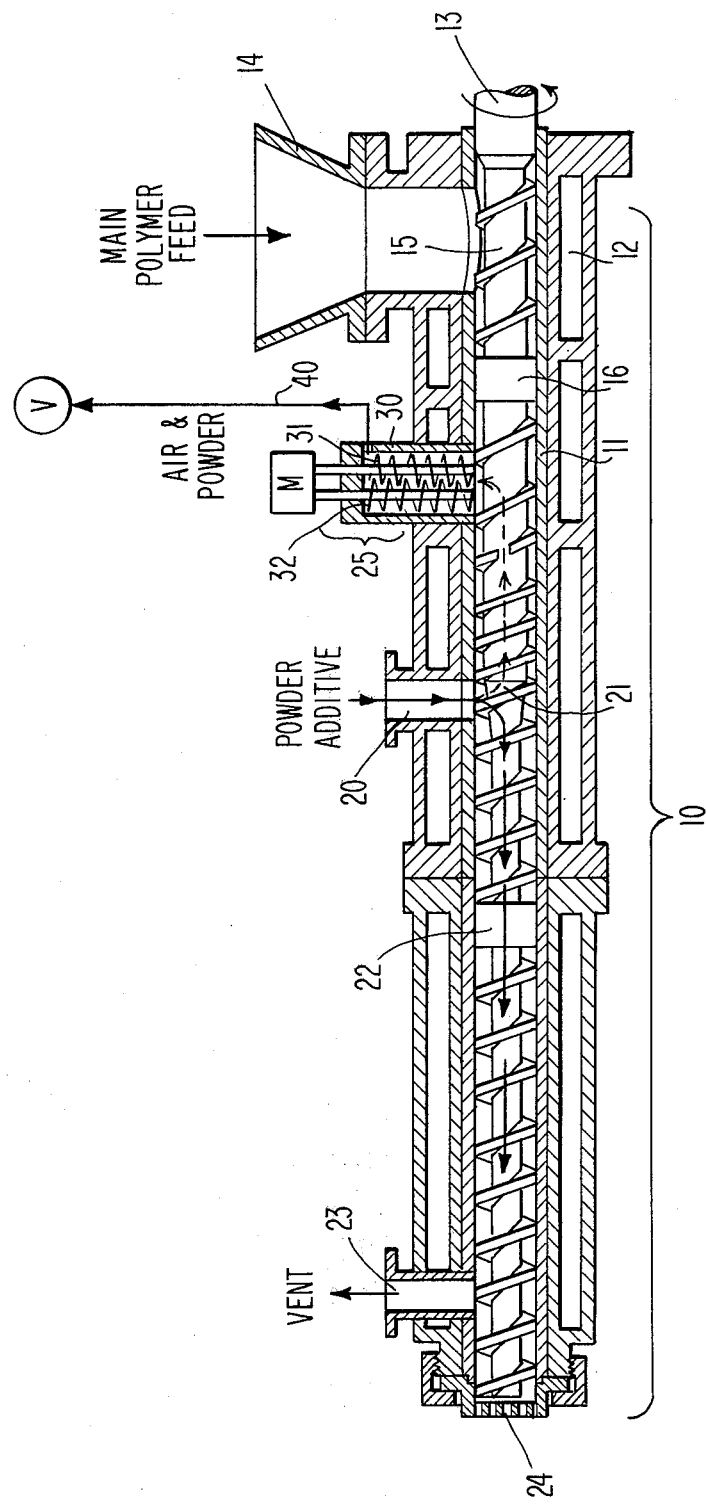

APPARATUS AND METHOD FOR FEEDING A POWDERY MATERIAL TO A PLASTICIZED, PRESSURIZED POLYMER

BACKGROUND OF THE INVENTION

This invention relates to an apparatus for feeding a powdery material to a plasticized polymer mass. Such powdery material usually contains entrapped air, and it has been a serious problem to feed and to mix the powdery material with the main polymer feed. When the two are introduced together in the main feed hopper of an extruder, the entrapped air is forced into the extruder itself and, as pressure within the extruder increases, the air is forced rearwardly, out of the main feed opening, entraining the powdery material and propelling it rearwardly out of the entrance, thus interfering with the entire feeding operation and causing a safety and housekeeping problem in the plant in which the extruder is located.

DISCUSSION OF THE PRIOR ART

Various means have been utilized in an attempt to overcome the problem. It has been proposed to use twin intermeshing screws, in order to engage and convey both the powdery material and the polymer, but trouble is still encountered because of the presence of air in the powdery material, particularly when the speed of the screws is increased to commercial levels. The air that is forced into the barrel, forcing air rearwardly toward the hopper, and the air velocity coming back toward the feed hopper is such that it entrains the powdered additive creating a hazard and a housekeeping problem.

The same problem is aggravated when the powder happens to contain a small amount of moisture, which is often the case. The moisture is heated within the extruder, creating hot water vapor which also is expelled rearwardly out of the feed hopper, contacting the incoming polymer and powdery material and causing further entrainment.

Efforts have been made to overcome the problem by using so-called "crammers" at the feed hopper, which are intended to jam the feed material in and remove the air. Devices of this general type appear in the U.S. Pat. to Slater No. 3,183,553, the U.S. Pat. to Oldham et al No. 3,114,930, and the U.S. Pat. to Davis No. 2,633,074. However, they have proven mechanically unsatisfactory and are difficult to clean and do not eliminate entrainment of the powdered additive in the air stream.

BRIEF DESCRIPTION OF THE INVENTION

It now has been discovered that all of the foregoing problems and disadvantages may be overcome in accordance with this invention, wherein the extruder is provided with an entrance for feeding the polymer, a separate entrance is provided for the powdery material, and a vent is provided between the two entrances. The extruder, of course, has an elongated worm (or plurality of worms either intermeshing, tangent or otherwise) together with worm flights arranged to transport the polymer from the entrance to a polymer exit formed in the barrel. The screws are less than full of polymer in the area between the powder inlet port and the air outlet port. A negative pressure is applied to the air outlet port and is communicated to the powder inlet port to provide a significant negative pressure at the powder inlet port.

According to this invention, means are provided forming an entrance port for the powdery material together with its entrapped air, downstream of the polymer entrance but upstream of the polymer exit, and vent means are provided in the extruder barrel, upstream of the point at which the powdery material is introduced, but downstream of the polymer entrance.

In accordance with a preferred form of the invention, means are provided for withdrawing the air from the barrel vent, such as by using a vacuum pump, or a vacuum eductor or the like. Further, although the great majority of the powdery material additive is taken up by the plasticized polymer mass as it flows downstream past the point of powdery additive introduction, some of the powdery additive flows upstream with the air. Accordingly, in accordance with the method of this invention, a main polymer feed is introduced into the extruder housing and caused to flow downstream therein, and is caused to form a material seal downstream of the point of polymer feed. Since the powdery additive is introduced at a point spaced downstream of the polymer seal and downstream of the vent, a majority of the powdery additive is taken up in the main flow of polymer as it flows past the powder feed port, but the air that was originally present in the powder is caused to flow upstream countercurrently with respect to the main polymer material, and is released or withdrawn from the housing at a point upstream of the point of introduction of the powdery additive but downstream of the polymeric material seal.

It has been discovered that surprisingly effective results are obtained in accordance with the apparatus and method of this invention; the powdery material mixes uniformly and intimately with the main polymer, the air escapes from the housing smoothly and evenly, and it is even possible to entrap particles of powder that might escape and to return them to the system without contaminating the surrounding atmosphere.

DETAILED DESCRIPTION OF THE INVENTION

Although the invention will be described in specific terms in the portions of the specification which follow, it will be appreciated that these specific terms are used only for the sake of clarity, and are not intended to limit the scope of the invention, which is defined in the appended claims.

Turning now to the drawing, the number 10 designates an extruder, which may be an extruder of any design, either single screw, twin screw, intermeshing or tangent. It includes a barrel 11, desirably provided with a heating jacket 12, and contains a screw 13 driven in rotation by a motor (not shown) in the direction indicated by the arrow appearing at the right hand portion of the drawing. The extruder 10 is provided with a main polymer feed hopper 14, through which the liquid or solid polymeric material to be processed is introduced into the extruder.

The worm 13 has a feed section 15 having flights which are constructed to feed the polymeric material and form a material seal at the cylindrical portion 16 of the worm. Such a seal may be formed by shallow forward flights, or any other restrictive means instead of cylinder 16. In this manner, the material is tightly packed, as shown, between the cylindrical portion 16 and the barrel 11, forming a barrier which prevents the passage of gas, such as air, past the material seal. At a point downstream of the cylindrical portion 16, a port 20 is provided for the introduction of powdery additive, which may contain air and frequently does. The worm flights at that point are "starved" or less than full as indicated at 21, but become full upstream of cylindrical portion 22 forming another material seal of the type heretofore discussed. Downstream of the cylindrical portion 22 a vent 23 may be provided for the release of volatiles, and an orifice plate 24 is provided at the exit end of the extruder.

It will be observed that a vent opening 25 is shown in the drawing, upstream of the powdery additive port 20, but downstream of the cylinder 16, for releasing the air contained in the powdery additive from the extruder housing. As shown, this vent housing 25 comprises a mechanical filter having a barrel 30 and a pair of driven worms 31, 32 which may be either intermeshing or tangent to one another, and which are driven in rotation as indicated by the arrows thereon, in a manner to prevent any powdery material from leaving the system, while allowing free passage of air through and out of the housing 30.

Accordingly, it will be realized that any air that is contained in the powdery additive is caused to flow upstream in the extruder, counter-currently to the flow of the main polymer material therein, in the direction indicated schematically by the arrows appearing in solid lines in the drawing (to some extent the air flows along the flight faces), and the air is vented or released out of the extruder through the release means 25.

It will be appreciated that, because of the pressures that are normally generated within the extruder housing, the air can be released through the releasing means 25 under its own pressure. However, it is preferred to induce the removal of air by drawing a vacuum V on the releasing means 25. If a small amount of powder is drawn out with the air, it may easily be contained and collected, by means well known in the art.

When a mechanical filter of the type identified by the number 25 is used, the rotation of the worms 31, 32 tends to entrap any powder that is entrained in the air, and to prevent it from leaving the system.

It is important in accordance with this invention to provide polymer seals downstream of the main polymer feed and upstream of the point of introduction of powdery additive. This isolates the main polymer feed hopper 14 from the air that is drawn into the extruder with the powder additive, and causes the air to flow counter-currently with respect to the main polymer material, and to be released downstream of the material seal 16.

It is also an important and advantageous feature of this invention to provide a polymer seal downstream of the point of introduction of the powdery additive, since this isolates the air and forces it to flow rearwardly, in a direction counter-current to the flow of the main polymer material.

Although it is not always an essential feature of this invention, it is also highly advantageous to provide a vent 23, downstream of the polymer seal formed at the cylindrical portion 22, for venting off any volatiles that may be contained in the main polymer feed, in the powdery additive, or both.

The mechanical filter 30 may be eliminated or replaced by any other vent means, including an ordinary vent, if desired. But in any event it is important to apply the vacuum V on vent 30 and to maintain the screw flights less than full between vent 30 and powder additive port 20, so that a negative pressure is present at the port 20.

Although this invention has been described in connection with a specific form thereof, it will be appreciated that many variations may be made, without departing from the spirit and scope of the invention as defined in the claims.

The following is claimed:

1. In an apparatus for feeding, to a plasticized polymer mass, a powdery material which contains entrapped air, the combination which comprises:
   a. an extruder having an entrance for feeding said polymer, and having an elongated worm arranged for rotation in a housing and having worm flights arranged to transport said polymer from said entrance to a polymer exit formed in said housing,
   b. means forming an entrance port for said powdery material together with its entrapped air, downstream of said polymer entrance, and
   c. vent means in said housing upstream of said means (b) but downstream of said polymer entrance and sealed therefrom.

2. The apparatus defined in claim 1, wherein sealing means are provided for forming a polymer seal between said vent means (c) and said entrance port means (b).

3. The apparatus defined in claim 1, wherein means are provided for drawing said air out of said housing, through said vent means (c).

4. The apparatus defined in claim 1, wherein means are provided for forming a plasticized polymer seal between said vent means (c) and said entrance of said extruder (a).

5. The apparatus defined in claim 1, wherein means are provided for forming a polymer material seal downstream of said entrance port (b), and wherein vent means are provided downstream of said seal.

6. The apparatus defined in claim 5, wherein said apparatus includes a worm flight which is running less than full in the vicinity of said vent, whereby volatiles are vented off at a location downstream of said polymer material seal, and wherein means are provided downstream of said vent for extruding the polymer product.

7. In a method for feeding, to a polymer mass, a powdery material which contains entrapped air, the steps which comprise feeding the main polymer feed and heating and plasticizing it, and forming it into a polymer seal within said housing, feeding the powder additive together with its entrained air into the housing at a point downstream of said polymer material seal, into contact with the plasticized polymer mass at the location of the point of introduction of said powdery material, whereby substantial quantities of said powdery material mix with the plasticized polymer mass and move downstream together, releasing from said housing, at a point upstream of the point of introduction of the powdery material, the air initially contained within said powdery material, and moving said air from said housing.

8. The method defined in claim 7, wherein a polymer seal is also formed downstream of the point of addition of said powdery material, said seal being composed of a mixture of said powdery material and said main polymer feed.

9. The method defined in claim 8, wherein volatiles are vented from said mixture of plasticized polymer material and of said powdery material, downstream of said seal.

10. The method defined in claim 7, wherein said air is drawn by vacuum out of said housing.

* * * * *